US008450010B2

(12) United States Patent
Gong et al.

(10) Patent No.: US 8,450,010 B2
(45) Date of Patent: May 28, 2013

(54) SEALING ASSEMBLY OF BATTERY, METHOD OF FABRICATING THE SAME, AND LITHIUM BATTERY

(75) Inventors: Qing Gong, Guangdong (CN); Xinping Lin, Guangdong (CN); Longfei Zhou, Guangdong (CN); Weifeng Zhang, Guangdong (CN)

(73) Assignees: Shenzhen BYD Auto R&D Company Limited, Shenzhen, Guangdong (CN); BYD Company Limited, Shenzhen, Guangdong (CN)

( * ) Notice: Subject to any disclaimer, the term of this patent is extended or adjusted under 35 U.S.C. 154(b) by 0 days.

(21) Appl. No.: 13/529,507

(22) Filed: Jun. 21, 2012

(65) Prior Publication Data

US 2012/0328933 A1  Dec. 27, 2012

(30) Foreign Application Priority Data

Jun. 23, 2011  (CN) .......................... 2011 1 0169968

(51) Int. Cl.
*H01M 2/08* (2006.01)
(52) U.S. Cl.
CPC ....................................... *H01M 2/08* (2013.01)
USPC ............................ 429/185; 429/180; 429/181

(58) Field of Classification Search
None
See application file for complete search history.

(56) References Cited

U.S. PATENT DOCUMENTS

| | | | | | |
|---|---|---|---|---|---|
| 3,959,013 | A | * | 5/1976 | Breiter | 429/185 |
| 4,061,841 | A | * | 12/1977 | Sharma et al. | 429/112 |
| 4,532,190 | A | * | 7/1985 | Kanbe et al. | 428/627 |
| 5,112,783 | A | * | 5/1992 | Sugise et al. | 501/126 |
| 5,678,832 | A | * | 10/1997 | Hill | 277/534 |
| 6,335,117 | B1 | * | 1/2002 | Yoshida et al. | 429/185 |
| 7,316,577 | B2 | * | 1/2008 | Latvaitis et al. | 439/86 |
| 2005/0255380 | A1 | * | 11/2005 | Lasater et al. | 429/184 |
| 2010/0200421 | A1 | * | 8/2010 | Aujollet | 205/412 |
| 2011/0244303 | A1 | * | 10/2011 | Rahmane et al. | 429/122 |

* cited by examiner

*Primary Examiner* — Patrick Ryan
*Assistant Examiner* — Jose Colucci Rios
(74) *Attorney, Agent, or Firm* — Finnegan, Henderson, Farabow, Garrett & Dunner, LLP

(57) ABSTRACT

A sealing assembly of a battery, a method for fabricating the sealing assembly and a lithium ion battery are provided. The sealing assembly may comprise: a ceramic ring having a receiving hole; a metal ring fitted over the ceramic ring; and a core column formed in the receiving hole, which comprises a metal-ceramic composite.

8 Claims, 2 Drawing Sheets

SEALING ASSEMBLY OF BATTERY, METHOD OF FABRICATING THE SAME, AND LITHIUM BATTERY

CROSS-REFERENCE TO RELATED APPLICATION

This application claims priority to and benefits of Chinese Patent Application No. 201110169968.3, filed with the State Intellectual Property Office of P. R. China on Jun. 23, 2011, the entire content of which is incorporated herein by reference.

FIELD

The present disclosure relates to the field of battery, and more particularly to a sealing assembly of a battery, a method for fabricating the same, and a lithium ion battery comprising the same.

BACKGROUND

In a conventional lithium ion battery sealing assembly, a cover and a core column of the sealing assembly may be sealed via a glass body. However, after a long time of use and storage of the lithium ion battery, a lower layer of the glass body which directly contacts with an electrolyte solution in the lithium ion battery may be corroded. For instance, a France company SAFT has performed an anti-corrosion test on the glass body via an accelerating aging experiment by assembling the sealing assembly and a body of the lithium ion battery to form the lithium ion battery, and depositing the lithium ion battery under a temperature of about 150° C. for seven days. The results indicate that a surface of the glass body was corroded, and gas tightness of the sealing assembly was reduced to less than $1.0 \times 10^{-7}$ $m^3 \cdot Pa/s$. A main reason therefor lies in that the metal lithium may reduce silicon dioxide in the glass body and infiltrate into the glass body continuously, which may not only reduce the glass insulation property, but also cause a leakage of the lithium ion battery.

Currently, the core column used in the battery is generally Kovar alloy of 4J series. With a continuous increment of battery capacity, the length and diameter of the core column are increasing accordingly. The battery may be affected by a high resistivity of the alloy during work. However, when metal alloys having low resistivity, such as aluminum and copper, may be used, the melting points of these alloys are normally lower than the sealing temperature of the glass body. Thus, the sealing requirement may not be satisfied.

SUMMARY

A sealing assembly of a battery may need to be provided, which may have improved anti-corrosion property and enhanced sealing performance. Further, a method for fabricating the same may also need to be provided. Still further, a lithium ion battery comprising the same may also need to be provided.

According to an embodiment of the present disclosure, a sealing assembly of a battery is provided. The sealing assembly of the battery may comprise: a ceramic ring having a receiving hole; a metal ring fitted over the ceramic ring for sealing an open end of the battery; and a core column formed in the receiving hole, which comprises a metal-ceramic composite.

According to another embodiment of the present disclosure, a method for fabricating a sealing assembly of a battery is provided. The method may comprise:
provide a ceramic ring having a receiving hole;
filling a ceramic material into the receiving hole of the ceramic ring, and sintering the ceramic material to obtain a ceramic porous body;
filling a metal material into the receiving hole of the ceramic ring above and/or under the ceramic porous body, treating the metal material at a temperature above the melting point of the metal material to melt the metal material and allow the melted metal material to infiltrate into the ceramic porous body, and obtaining a metal-ceramic composite after cooling; and
welding a metal ring to the ceramic ring so as to fit the metal ring over the ceramic ring.

According to still another embodiment of the present disclosure, a lithium ion battery is provided. The lithium ion battery may comprise:
a shell having at least one open end;
a sealing assembly sealing the open end of the shell to form a sealed space; and
an electric core and an electrolyte solution disposed in the sealed space,
in which the sealing assembly is as disclosed above, the metal ring of the sealing assembly is connected with the shell, and the core column of the sealing assembly is connected with the electric core.

With the sealing assembly disclosed herein, by interposing the ceramic ring between the metal ring and the core column for connecting each other, the shell of the battery may be insulated from the core column, which may achieve excellent sealing therebetween. In addition, with the core column comprising a metal-ceramic composite, the connection between the ceramic porous body and the ceramic ring may be stably formed via sintering. And because the melted metal material is infiltrated into the ceramic porous body, the metal material and the ceramic porous body may be closely combined with each other, and thus a reliable sealing assembly with excellent sealing property may be achieved. Moreover, the ceramic ring has strong anti-corrosion and good insulation performances, which may effectively extend the lifetime of the lithium ion battery.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
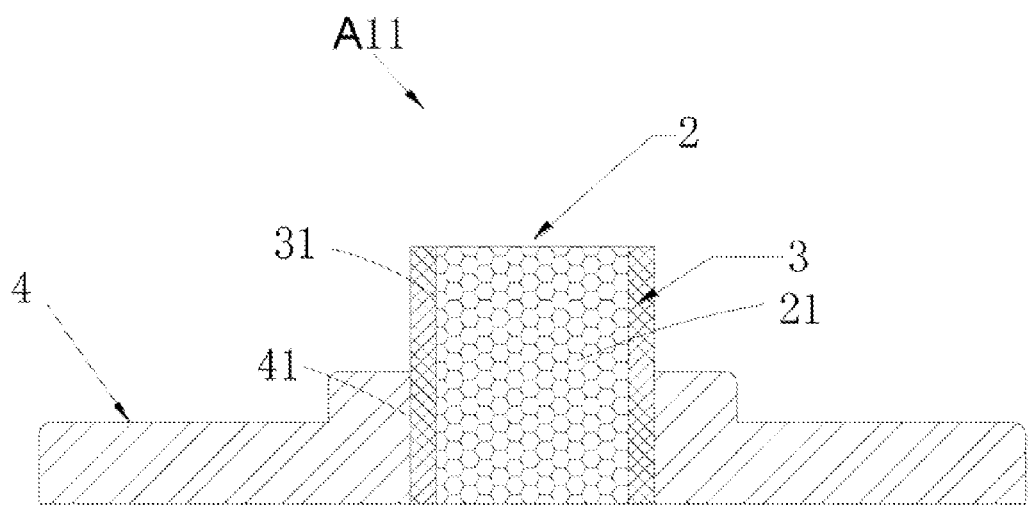
FIG. 1 is a cross-sectional view of a sealing assembly of a battery according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. It is to be understood that, the embodiments described herein are merely used to generally understand the present disclosure, but shall not be construed to limit the present disclosure.

Furthermore, phrases or terms used herein with reference to device or element orientation, such as "lower", "upper," etc., are only used to describe relative positional relationships of elements in a sealing assembly and/or portions thereof shown in the cross-sectional views of the sealing assembly in FIGS. 1-4, but shall not be construed to limit particular positional relationships of the elements and portions thereof referred in a lithium ion battery.

Figure 4:
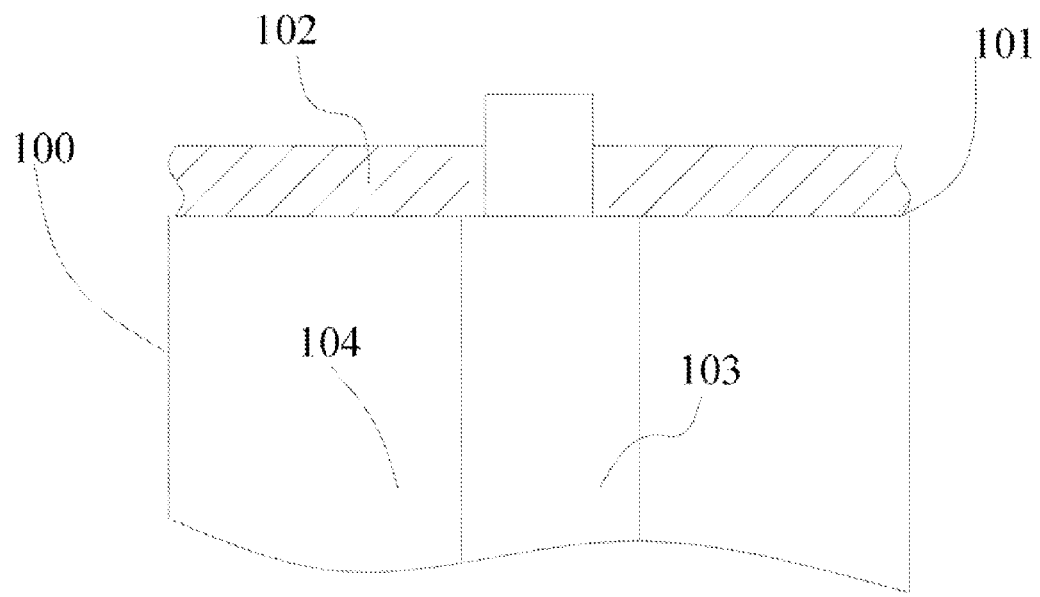
FIG. 4 is a cross-sectional view of a lithium ion battery according to an embodiment of the present disclosure.

According to an embodiment of the present disclosure, a sealing assembly of a battery may be applied for sealing a battery, particularly a lithium ion battery, and more particularly a high power lithium ion battery, such as a lithium ion power battery and a lithium ion energy storage battery. As shown in FIG. 4, a lithium ion battery disclosed herein may comprise: a shell 100 having at least an open end 101, an electric core 103 disposed in the shell, and an electrolyte solution 104 received in the shell 100. The open end 101 of the shell 100 may be sealed via a sealing assembly 102 to prevent leakage of the electrolyte solution 104. In some embodiments, the shell 100 may be made of aluminum or steel for disposing the pole core 103 and receiving the electrolyte solution 104. In some embodiments, the electric core 103 may be formed by sequentially stacking or rolling a positive pole sheet, a diaphragm and a negative pole sheet. For clarity purpose, the detailed description of the pole core 103 is hereby omitted, which may be known in the art.

In an embodiment as shown in FIG. 1, the sealing assembly 102 may comprise: a ceramic ring 3, a metal ring 4 and a core column 2. The metal ring 4 may be fitted over the ceramic ring 3, and may be used for sealing the open end 101 of the battery. The ceramic ring 3 may comprise a receiving hole 31 formed at the center part thereof. The core column 2 may be formed in the receiving hole 31 and comprise a metal-ceramic composite 21.

In some embodiments, the metal ring 4 may comprise an aluminum ring or an aluminum alloy ring. In some embodiments, the metal ring 4 may be welded to the shell 100 of the lithium ion battery so as to allow the sealing assembly 102 to seal the open end 101 of the shell 100. For instance, the metal ring 4, which may be made of the same material as that of the shell 100, such as a steel plate, is used for connecting with the shell 100 of the lithium ion battery, for example, via welding, to realize an enclosed connection between the whole sealing assembly 102 and shell 100. In some embodiments, a mounting hole 41 may be formed in the metal ring 4 for accommodating the ceramic ring 3.

In some embodiments, a diameter of the mounting hole 41 may equal with be equal to an outer diameter of the ceramic ring 3. In some embodiments, because the core column 2 may be configured as one pole of the battery, and the shell 100 which is connected with the metal ring 4 may be configured as the opposite pole of the battery, the core column 2 may be insulated from the metal ring 4. By interposing the ceramic ring 3 between the core column 2 and the metal ring 4, the core column 2 and the metal ring 4 may be connected with each other but insulated from each other.

The ceramic ring 3 may be chosen, for example, from an alumina ceramic ring, a zirconia ceramic ring, an aluminum nitride ceramic ring, a boron nitride ceramic ring, a silicon nitride ceramic ring, and a ceramic ring of a compound of alumina and zirconia. In some embodiments, the alumina ceramic ring or the ceramic ring of alumina and zirconia may be adopted for forming excellent bonding with a metal body of copper in the column core. The ceramic ring 3 may possess a strong anti-corrosion property to avoid corrosion by the electrolyte solution 104, thus extending the lifetime of the lithium ion battery. Moreover, the ceramic ring 3 may have a better anti-impact strength and thermal shock resistance than those of a conventional glass body, which may improve the stability and safety of the sealing assembly 102. Compared with a ceramic plate, the ceramic ring 3, as a sealing medium, may be thicker with stronger thermal shock resistance and thermal cycling performance. In some embodiments, the thickness of the ceramic ring 3 may be about 6.5±3 mm, the outer diameter of the ceramic ring 3 may be about 20±1 mm, and the diameter of the receiving hole 31 may be about 10±0.5 mm.

A main improvement of the present disclosure lies in that the core column 2 comprises the metal-ceramic composite 21. In some embodiments, the metal-ceramic composite 21 may comprise a ceramic porous body and a metal material filled in pores of the ceramic porous body. A ceramic composite structure may be formed by the ceramic porous body and the ceramic ring 3. If the sealing assembly 102 is configured as a positive pole of a battery, the metal material may be chosen, for example, from aluminum and an aluminum alloy. In some embodiments, a magnesium-aluminum alloy may be adopted. If the sealing assembly 102 is configured as a negative pole of a battery, the metal material may be chosen, for example, from copper and a copper alloy. In some embodiments, a mixture of copper and an oxide of copper, i.e. copper oxide or cuprous oxide, may be adopted. The metal-ceramic composite 21 may have excellent electrical conductivity to form a good electrical connection with the electric core 103 of the lithium ion battery. Moreover, because the ceramic porous body and the ceramic ring 3 may form an integrated structure, the metal material is melted and filled into the ceramic porous body, the manufacturing process of which will be described in detail hereinafter, a good wetting between the metal material and the ceramic porous body may be achieved, and a good connection between the whole metal-ceramic composite 21 and the ceramic ring 3 may be obtained accordingly. Therefore, it may enhance the reliability of the entire sealing assembly 102 with an improved sealing effect.

Figure 2:
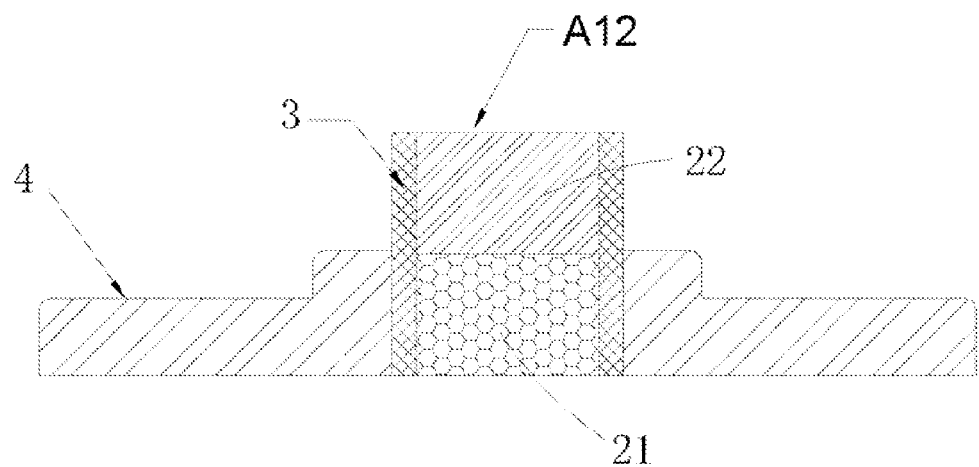
FIG. 2 is a cross-sectional view of a sealing assembly of a battery according to another embodiment of the present disclosure.
Figure 3:
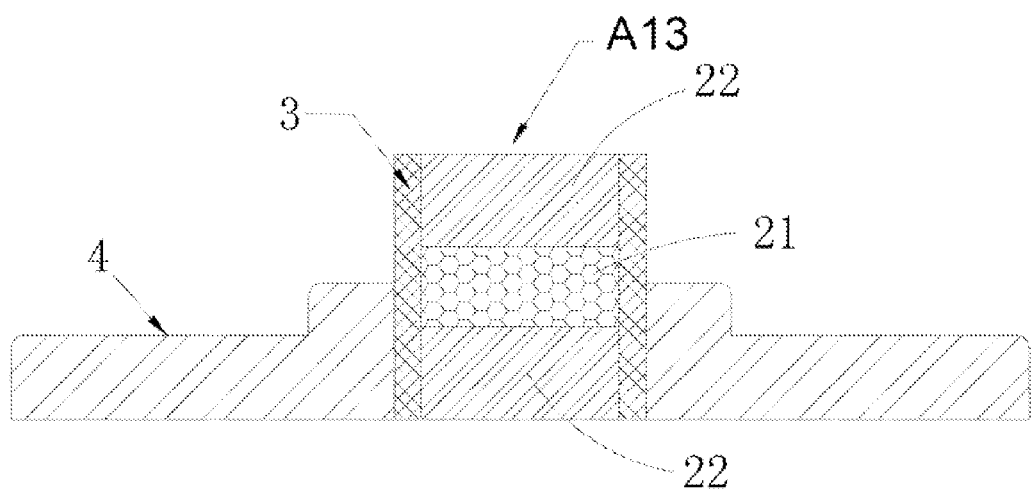
FIG. 3 is a cross-sectional view of a sealing assembly of a battery according to yet another embodiment of the present disclosure.

FIGS. 2 and 3 are cross-sectional views of the sealing assembly 102 according to some embodiments of the present disclosure. As shown in FIG. 2 and FIG. 3, the core column 2 may further comprise at least one metal part 22. The metal part 22 may be disposed at an upper end or a lower end of the metal-ceramic composite 21, and also received in the ceramic ring 3, as shown in FIG. 2. In some embodiments, the metal parts 22 may be disposed at both the upper end and a lower end of the metal-ceramic composite 21, and received in the ceramic ring 3, as shown in FIG. 3. The metal part 22 may be formed by the metal material of the metal-ceramic composite 21 described above, the manufacturing process of which will be described in detail hereinafter. If the sealing assembly 102 is configured as a positive pole of a battery, the metal material may be chosen, for example, from aluminum and an aluminum alloy. If the sealing assembly 102 is configured as a negative pole of a battery, the metal material may be chosen, for example, form copper and a copper alloy. The core columns 2 shown in FIG. 2 and FIG. 3 comprise the metal-ceramic composite 21 and the metal part 22. The metal-ceramic composite 21 may comprise the ceramic porous body and the metal material filled in the pores of the ceramic porous body. The ceramic porous body and the ceramic ring 3 may form an integrated structure. A portion of the melted metal material, which is infiltrated into the ceramic porous body, and the ceramic porous body may form the metal-ceramic composite 21 after cooling, while a portion of the melted metal material, which is not infiltrated into the ceramic porous body, may form the metal part 22 after cooling. The core column 2 having either of the above two structures may form a good electrical connection with the electric core 103 of the lithium ion battery, and maintain an integral connection with the ceramic ring 3. Therefore, the entire sealing assembly 102 may have improved reliability and sealing effect.

A method for fabricating the sealing assembly 102 according to an embodiment of the present disclosure is provided. The method may comprise the following steps.

Firstly, a ceramic ring 3 having a receiving hole 31 may be provided (Step 1). The ceramic ring 3 may be formed by any process known in the art. In some embodiments, a ceramic powder may be compressed into the ceramic ring 3 by dry-pressing. The material of the ceramic powder may be chosen, for example, from any one of alumina, zirconia, aluminum nitride, boron nitride, silicon nitride, or a combination thereof. The receiving hole 31 may be formed in a central part of the ceramic ring 3 after the ceramic ring 3 is formed.

Then, a ceramic material may be filled into the receiving hole 31 of the ceramic ring 3, and a ceramic porous body may be obtained via sintering (Step 2). The ceramic material may comprise a ceramic powder which is directly filled into the receiving hole 31 of the ceramic ring 3, or made into a slurry and then filled into the receiving hole 31 of the ceramic ring 3. In some embodiments, the ceramic powder may be made into the slurry and then filled into the receiving hole 31 of the ceramic ring 3. The ceramic powder may be same as that of the ceramic ring 3, that is, the ceramic powder may be chosen, for example, from any of alumina, zirconia, aluminum nitride, boron nitride, silicon nitride, or a combination thereof. The ceramic powder and a solvent may be made into the slurry, in which a weight percent of the ceramic powder may range from 50% to 70%, and the solvent may be a conventional solvent adapted for the ceramic powder, such as paraffin. In some embodiments, the ceramic powder may comprise ceramic powders with different particle diameters. In some embodiments, the ceramic powder may comprise a first ceramic powder of a particle diameter ranging from 12 µm to 18 µm and a second ceramic powder of a particle diameter ranging from 2 µm to 5 µm, and a weight ratio of the first and second ceramic powders may range from 3:1 to 2:1. The slurry made by ceramic powders with different particle diameters may be dispersed uniformly. In some embodiments, the sintering may be performed at a sintering temperature of about 1650±50° C. for about 2±1 hours. In some embodiments, a binder removal step may be performed to the ceramic material for removing the solvent at a temperature of about 550±50° C. for a period of time ranging from about 12 hours to about 24 hours, and then the sintering may follow. In some embodiments, the ceramic ring 3 and the ceramic material filled into the ceramic ring 3 may be simultaneously sintered to form an integrated ceramic composite structure.

The metal material may be filled into the receiving hole 31 of the ceramic ring 3 above and/or under the sintered ceramic porous body, the metal material may be treated at a temperature above the melting point of the metal material to melt the metal material and allow the melted metal material to infiltrate into the ceramic porous body, and a metal-ceramic composite may be obtained after cooling (Step 3). In this step, the metal material may be heated at the temperature above the melting point of the metal material so that the melted metal material may be infiltrated into the ceramic porous body by a capillary effect, that is, when the melted metal material is in contact with the ceramic porous body having pores, if a wetting occurs, the melted metal material may infiltrate into the ceramic porous body via the pores. In one embodiment, the melted metal material may be entirely infiltrated into the ceramic porous body to form the metal-ceramic composite. And in another embodiment, a first portion of the melted metal material may be infiltrated into the ceramic porous body, while a second portion of the melted metal material may not be infiltrated into the ceramic porous body, and thus the first portion of the melted metal material and the ceramic porous body form the metal-ceramic composite, and the second portion of the melted metal material forms at least one metal part disposed at an upper end and/or a lower end of the metal-ceramic composite. As shown in FIG. 1, the ceramic porous body may be formed in the whole receiving hole 31 of the ceramic ring 3, and the melted metal material may be entirely infiltrated into the ceramic porous body to form the metal-ceramic composite after cooling. As shown in FIG. 2, the ceramic porous body may be formed at a lower end of the receiving hole 31 of the ceramic ring 3, while the first portion of the melted metal material infiltrated into the ceramic porous body and the ceramic porous body may form the metal-ceramic composite after cooling, and the second portion of the melted metal material not infiltrated into the ceramic porous body may form the metal part 22 disposed at the upper end of the metal-ceramic composite after cooling. As shown in FIG. 3, the ceramic porous body may be formed at a lower end of the receiving hole 31 of the ceramic ring 3, the first portion of the melted metal material infiltrated into the ceramic porous body and the ceramic porous body may form the metal-ceramic composite after cooling, and the second portion of the melted metal material not infiltrated into the ceramic porous body may form the metal parts 22 disposed at the upper end and the lower end of the metal-ceramic composite after cooling. The term "not infiltrated" used herein refers to a portion of the metal material not entering the ceramic porous body, and also refers to a portion first entering and then effused out of the ceramic porous body. In step 2 of the method disclosed herein, the ceramic ring 3 and the ceramic material filled into the ceramic ring 3 may be sintered to form the integrated structure of the ceramic composite structure. In this step 3, by melting the metal material to obtain the melted metal material and then infiltrating the melted metal material into the ceramic porous body to form the metal-ceramic composite 21 after cooling, a good combination between the metal material and the ceramic porous body may be formed. In one embodiment, if the sealing assembly 102 is configured as a positive pole of the battery, the metal material may be chosen, for example, from aluminum and an aluminum alloy, and may be treated at a temperature above the melting point of the aluminum or aluminum alloy for about 1-3 hours. In some embodiments, the metal material may comprise a magnesium aluminum alloy, because a melted magnesium aluminum alloy may effectively realize a pressureless infiltration into the ceramic porous body. The pressureless infiltration of the magnesium aluminum alloy may be performed at a temperature ranging from about 950° C. to about 1050° C. and for a period of time ranging from about 1 hour to 3 hours. In another embodiment, if the sealing assembly 102 is configured as a negative pole of a battery, the metal material may be a mixture of copper and copper oxides, i.e. copper oxide or cuprous oxide. Copper or a copper alloy cannot wet the ceramic porous body, thus neither realizing the pressureless infiltration of the metal material into the ceramic porous body, nor realizing the formation of an interface joint between the metal-ceramic composite 21 and an inner wall of the ceramic ring 3. The pressureless infiltration of the mixture of copper and copper oxides may be treated at a temperature ranging from about 1250° C. to about 1300° C. for about 1 hour to 3 hours. The melted metal material may be infiltrated into the ceramic porous body by a capillary effect to form the metal-ceramic composite 21 and wet the inner wall of the ceramic ring 3 via a liquid phase. Consequently, the firm interface joint between the metal-ceramic composite 21 and the ceramic ring 3 may be formed after cooling, which may achieve a tight sealing between the ceramic ring 3, the ceramic porous body and the metal material.

Finally, the metal ring 4 may be welded to the ceramic ring 3 so that the metal ring 4 may be fitted over the ceramic ring 3 (Step 4). In some embodiments, the metal ring 4 may be fitted over the ceramic ring 3 via soldering or fusion casting. During soldering, the welding between metal and ceramic may be realized by using a soldering flux at a temperature under the melting point of a metal base material. During the fusion casting, the welding between metal and ceramic may be realized by melting the metal base material. For clarity purpose, the steps and parameters of the fusion casting will not be described in detail, which may be easily implemented or obtained in the art. In some embodiments where the soldering process is adopted, an aluminum silicon (Al—Si) alloy, aluminum magnesium (Al—Mg) alloy or aluminum silicon magnesium (Al—Si—Mg) alloy may be used as a soldering material for welding ceramic and aluminum. In some embodiments, to enhance the welding effect, the aluminum silicon (Al—Si) alloy may be used, in which the Si content may range from above 0 to 12 wt %, and the balance is aluminum, and the soldering may be performed at a temperature ranging from about 570° C. to about 660° C. for about 5 minutes to about 30 minutes under an atmosphere of vacuum or inert gas. After the soldering, a soldering flux layer may be formed between the metal ring 4 and the ceramic ring 3, so that the metal ring 4 and the ceramic ring 3 may be connected via the soldering flux layer.

From above, by interposing the ceramic ring 3 between the metal ring 4 and the core column 2 for connecting each other, the shell 100 and the core column 2 may be insulated from each other, and thus a sealed space may be obtained accordingly. The core column 2 may be configured as an electrode of the battery for electrically connecting with the electric core 103 of the battery. With the infiltration of the melted metal material into the ceramic porous body, the metal material and the ceramic porous body may be closely combined with each other, and thus a reliable sealing assembly with excellent sealing properties may be achieved. Moreover, the ceramic ring 3 may have strong anti-corrosion and good insulation performances, which may effectively extend the lifetime of the lithium ion battery.

In one embodiment, the shell 100 of the lithium ion battery may be configured as a positive pole, and the core column 2 of the sealing assembly 102 may be configured as a negative pole when the lithium ion battery is assembled. In this embodiment, the sealing assembly 102 may be configured as the negative pole of the battery and the shell 100 may have at least one open end. The electric core 103 may be provided in the shell 100, and the electrolyte solution 104 is injected into the shell 100. Alternatively, the electrolyte solution 104 may also be injected via an injecting hole (not shown) in the metal ring 4. Then, the sealing assembly 102 may be mounted at the open end 101 of the shell 100. During the above process, the metal ring 4 of the sealing assembly 102 and the shell 100 may be welted together, and the core column 2 of the sealing assembly 102 and the electric core 103 may be connected. In some embodiments, a positive tab of the electric core 103 may be connected with the shell 100, and a negative tab of the electric core 103 may be connected with the core column 2. A sealed space may be formed between the sealing assembly 102 and the shell 100 after assembly. The electric core 103 and the electrolyte solution 104 may be received in the sealed space. The shell 100 and the core column 2 may be configured as two poles of the lithium ion battery respectively to be connected with power-consuming devices.

In the following, examples embodying the gist or essence of the present disclosure will be described in detail for the better understanding of the present disclosure. However, it should be noted that the following examples are presented for illustration purpose only rather than limitation.

Example 1

A method for fabricating the sealing assembly 102 will be described hereinafter with reference to FIG. 1.

Formation of the ceramic ring 3: An alumina ceramic powder with an alumina content of 95 wt % and a balance of 5 wt % of a sintering aid phase, such as glass having a composition of $CaO$—$MgO$—$Al_2O_3$—$B_2O_3$, was compressed into the ceramic ring 3 by dry-pressing. A receiving hole 31 was formed in the center part of the ceramic ring 3.

Formation of the ceramic porous body: Two alumina ceramic powders with respective particle diameters of 12 μm and 2 μm were mixed with each other at a weight ratio of 3:1, and then paraffin was added to form a slurry which had a content of the alumina ceramic powders of 65 wt %. The slurry was then filled into the receiving hole 31 of the ceramic ring 3 formed above. The ceramic ring 3 with the slurry filled therein was put into a sintering oven. The temperature in the sintering oven was increased to 600° C. with a heating rate of 5° C./min, and a binder removal step was performed for 2 hours. Then the temperature was increased to 1650° C. with a heating rate of 5° C./min, and the ceramic porous body was obtained after sintering for 2 hours. The ceramic porous body was formed in the entire receiving hole 31 of the ceramic ring 3.

Formation of the metal-ceramic composite 21: A mixture of Cu and $Cu_2O$ with a weight ratio of 3.5:1 was filled into the receiving hole 31 of the sintered ceramic ring 3 above the ceramic porous body, and treated under inert gas at a temperature of about 1250° C. for 2 hours to allow the mixture of Cu and $Cu_2O$ to be entirely infiltrated into the ceramic porous body, thus obtaining a tight sealing with the inner wall of the ceramic ring 3.

Mounting of the metal ring 4: An aluminum silicon alloy was used as a soldering flux. The metal ring 4 was fitted over the ceramic ring 3 under vacuum at a temperature of about 600° C. Thus, a sealing assembly 102 labeled as A11 to be used as the negative pole of a battery as shown in FIG. 1 was obtained.

Example 2

A method for fabricating the sealing assembly 102 will be described hereinafter with reference to FIG. 2. In this example, the sealing assembly 102 was used as a positive pole of a battery.

Formation of the ceramic ring 3: The ceramic ring 3 was formed as described in Example 1.

Formation of the ceramic porous body: Two alumina ceramic powders with respective particle diameters of 12 μm and 3 μm were mixed with each other at a weight ratio of 3:1, and then paraffin was added to form a slurry, which had a content of the alumina ceramic powders of 65 wt %. Then the slurry was filled into the receiving hole 31 of the ceramic ring 3. And the ceramic ring 3 and the slurry filled therein was put into a sintering oven. The temperature of the sintering oven was increased to 600° C. with a heating rate of 5° C./min, and a binder removal step was performed for 2 hours. Then the temperature was increased to 1700° C. with a heating rate of 5° C./min, and the ceramic porous body was obtained after sintering for 3 hours. The ceramic porous body was formed at a lower end of the receiving hole 31 of the ceramic ring 3.

Formation of the metal-ceramic composite 21: A magnesium aluminum alloy was filled into the receiving hole 31 of the sintered ceramic ring 3 above the ceramic porous body, and treated under inert gas at a temperature of about 1000° C. for 3 hours. The portion of the melted magnesium aluminum alloy infiltrated into the ceramic porous body formed the metal-ceramic composite 21, and the portion of the melted magnesium aluminum alloy not infiltrated into the ceramic porous body formed the metal part 22 disposed at an upper end of the metal-ceramic composite 21 after cooling.

Mounting of the metal ring 4: An aluminum silicon alloy was used as a soldering flux. The metal ring 4 was fitted over the ceramic ring 3 under vacuum at a temperature of about 600° C. Thus, a sealing assembly 102 labeled A12 to be used as the positive pole of a battery as shown in FIG. 2 was obtained.

Example 3

A method for fabricating the sealing assembly 102 will be described hereinafter with reference to FIG. 3. In this example, the sealing assembly 102 was used for a negative pole of a battery.

Formation of the ceramic ring 3: The ceramic ring 3 was formed as described in Example 1.

Formation of the ceramic porous body: Two alumina ceramic powders with respective particle diameters of 11 μm and 5 μm were mixed with each other at a weight ratio of 3:1, and then paraffin was added to form a slurry, which had a content of the alumina ceramic powders of 65 wt %. Then the slurry was filled into the receiving hole 31 of the ceramic ring 3. And the ceramic ring 3 and the slurry filled in the ceramic ring 3 were put into a sintering oven. The temperature of the sintering oven was increased to 600° C. with a heating rate of 5° C./min, and a binder removal step was performed for 2 hours. Then the temperature was increased to 1650° C. with a heating rate of 5° C./min, and the ceramic porous body was obtained after sintering for 2 hours. The ceramic porous body was formed at a middle portion of the receiving hole 31 of the ceramic ring 3.

Formation of the metal-ceramic composite 21: A mixture of Cu and $Cu_2O$ with a weight ratio of 2.5:1 was filled into the receiving hole 31 of the sintered ceramic ring 3 above the ceramic porous body, and treated under inert gas at a temperature of about 1300° C. for 4 hours. The portion of the melted mixture of Cu and $Cu_2O$ infiltrated into the ceramic porous body formed the metal-ceramic composite, and the portion of the melted mixture of Cu and $Cu_2O$ not infiltrated into the ceramic porous body and the portion of the melted mixture of Cu and $Cu_2O$ first infiltrated into and then effused out of the ceramic porous body formed the metal parts 22 at the upper end and the lower end of the metal-ceramic composite 21 after cooling, respectively.

Mounting of the metal ring 4: An aluminum silicon alloy was adopted as a soldering flux. The metal ring 4 was fitted over the ceramic ring 3 under vacuum at a temperature of about 600° C. Thus, a sealing assembly 102 labeled as A13 to be used as the negative pole of a battery as shown in FIG. 3 was obtained.

Comparative Example 1

Fabrication of a conventional sealing assembly of a battery will be described as follows.

According to a sealing method with a glass body disclosed in Chinese Patent No. CN201397827, by sealing a cover plate of a battery and a core column made of aluminum and copper via the glass body, a sealing assembly D1 for the positive pole of a battery and a sealing assembly D2 for the negative pole of a battery were obtained.

Comparative Example 2

Fabrication of a conventional sealing assembly of a battery will be described as follows.

By welding a ceramic ring and a core column made of aluminum and copper via ceramic sealing, a sealing assembly D3 for the positive pole of a battery and a sealing assembly D4 for the negative pole of a battery were obtained.

Performance Test

1. Gas Tightness Test

The sealing assemblies A11, A12 and A13 as provided in Examples 1-3 and the sealing assemblies D1, D2, D3 and D4 as provided in Comparative Examples 1-2 were disposed in a sealed clip cavity. Connecting parts of these seal assemblies under test were exposed out of the sealed clip cavity. The sealed clip cavity was charged with a gas having a pressure of 0.6 MPa for 3 minutes with water being dropped at the connecting parts. If bubbles were generated at the connecting parts, it was determined that there was gas leakage, otherwise the gas tightness of the sealing assembly was qualified. The test result is shown in Table 1.

TABLE 1

| Sealing assembly | Result |
| --- | --- |
| A11 | no bubble appearing at the connecting part |
| A12 | no bubble appearing at the connecting part |
| A13 | no bubble appearing at the connecting part |
| D1 | bubble appearing at the connecting part, failed the gas tightness test |
| D2 | bubble appearing at the connecting part, failed the gas tightness test |
| D3 | no bubble appearing at the connecting part |
| D4 | no bubble appearing at the connecting part |

2. Thermal Shock Test

The seal assemblies A11, A12 and A13 as provided in Examples 1-3 and the seal assemblies D3 and D4 as provided in Comparative Example 2 were disposed in cold water at about 0° C. for 3 minutes, and then immediately moved into a boiling water with a temperature at about 100° C. for 3 minutes. Such process was repeated for a plurality of times to test whether gas tightness of the sealing assembly still remained. The test result is shown in Table 2.

TABLE 1

| Sealing assembly | Result |
| --- | --- |
| A11 | After 200 times of thermal shock tests, gas tightness still remained. |
| A12 | After 200 times of thermal shock tests, gas tightness still remained. |
| A13 | After 200 times of thermal shock tests, gas tightness still remained. |
| D3 | After 10 times of thermal shock tests, gas tightness was lost. |
| D4 | After 10 times of thermal shock tests, gas tightness was lost. |

It can be seen from Table 1 and Table 2 that the sealing assemblies A11, A12 and A13 as provided in Examples 1-3 of the present disclosure still passed the gas tightness test after 200 times of thermal shock tests. The sealing assemblies D1 and D2 as provided in Comparative Example 1 failed to pass the gas tightness test. Although the sealing assemblies D3 and D4 as provided in Comparative Example 2 passed the gas tightness test, they failed after 10 times of thermal shock tests. The result indicates that the sealing assemblies as provided in the present disclosure have more reliable connections and better sealing effects.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A sealing assembly of a battery, comprising:
   a ceramic ring having a receiving hole;
   a metal ring fitted over the ceramic ring for sealing an open end of the battery; and
   a core column comprising a metal-ceramic composite, wherein the whole core column is received in the receiving hole.

2. The sealing assembly according to claim 1, wherein the metal-ceramic composite comprises:
   a ceramic porous body; and
   a metal material filled in pores of the ceramic porous body, wherein the metal-ceramic composite and the ceramic ring form a ceramic composite structure.

3. The sealing assembly according to claim 2, wherein the metal material of the metal-ceramic composite comprises a magnesium aluminum alloy.

4. The sealing assembly according to claim 2, wherein the metal material of the metal-ceramic composite comprises a mixture of copper and an oxide of copper.

5. The sealing assembly according to claim 1, wherein the core column further comprises at least one metal part disposed at an upper end and/or a lower end of the core column.

6. The sealing assembly according to claim 5, wherein the at least one metal part comprises a magnesium aluminum alloy.

7. The sealing assembly according to claim 5, wherein the at least one metal part comprises a mixture of copper and an oxide of copper.

8. The sealing assembly according to claim 1, wherein the ceramic ring is chosen from an alumina ceramic ring, a zirconia ceramic ring, an aluminum nitride ceramic ring, a boron nitride ceramic ring, a silicon nitride ceramic ring, and a ceramic ring of alumina and zirconia, and
   wherein the metal ring is chosen from an aluminum ring and an aluminum alloy ring, and comprises a mounting hole.

* * * * *